Figure 1:
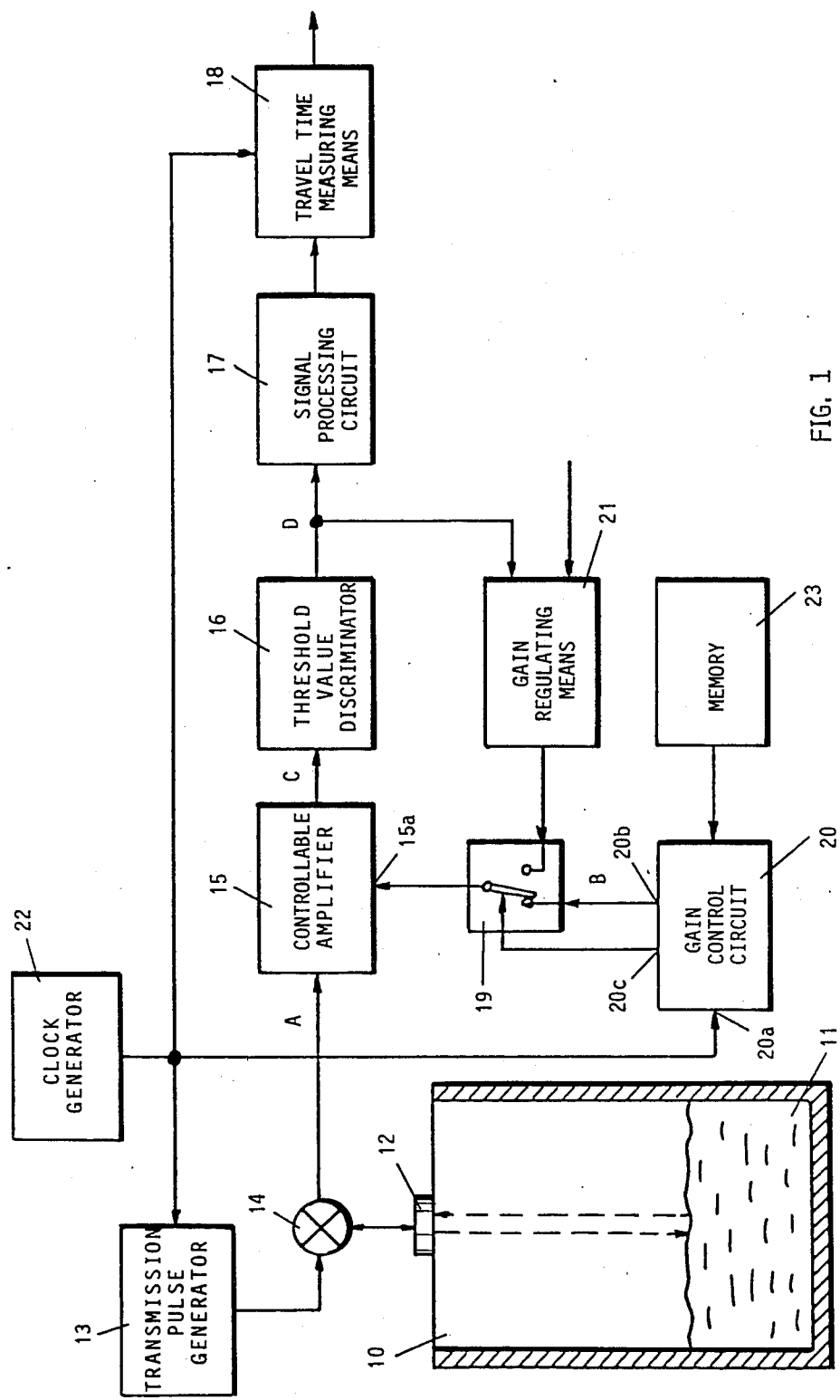

United States Patent [19]

Lau

[11] Patent Number: 4,675,854
[45] Date of Patent: Jun. 23, 1987

[54] SONIC OR ULTRASONIC DISTANCE MEASURING DEVICE

[75] Inventor: Jürgen Lau, Weil am Rhein, Fed. Rep. of Germany

[73] Assignee: Endress u. Hauser GmbH u. Co., Fed. Rep. of Germany

[21] Appl. No.: 656,229

[22] Filed: Oct. 1, 1984

[30] Foreign Application Priority Data

Nov. 4, 1983 [DE] Fed. Rep. of Germany ....... 3339984

[51] Int. Cl.$^4$ .............................................. G01S 9/68
[52] U.S. Cl. .................................... 367/908; 367/900; 367/99; 367/98
[58] Field of Search .................. 367/98, 99, 900, 908, 367/97, 95, 87

[56] References Cited

U.S. PATENT DOCUMENTS

| 3,683,324 | 8/1972 | Hoxsie | 367/114 |
| 4,204,280 | 5/1980 | Slaton | 367/98 |
| 4,398,423 | 8/1983 | Takahashi | 367/900 |
| 4,420,824 | 12/1983 | Weber | 367/98 |

FOREIGN PATENT DOCUMENTS

| 957824 | 2/1959 | Fed. Rep. of Germany . |
| 1094026 | 12/1960 | Fed. Rep. of Germany . |
| 2623892 | 12/1977 | Fed. Rep. of Germany . |
| 2632674 | 1/1978 | Fed. Rep. of Germany . |

Primary Examiner—Thomas H. Tarcza
Assistant Examiner—Daniel T. Piholic
Attorney, Agent, or Firm—Barnes & Thornburg

[57] ABSTRACT

The sonic or ultrasonic distance measuring device used for example to measure the filling level in a container comprises an electroacoustic transducer which operates alternately as transmission transducer for the transmission of sonic or ultrasonic pulses and as reception transducer for the reception of the reflected echo pulses. Connected to the transducer is a signal processing circuit which includes an amplifier with controllable gain and a threshold value discriminator. A gain control circuit controls the gain of the amplifier during a predetermined period after the start of each transmission pulse in accordance with a stored function which is fixed in accordance with the dying-down behaviour of the transducer so that the electrical signals originating from the dying-down of the transducer after amplification are smaller than the threshold value of the threshold value discriminator but are as close as possible to said threshold value. As a result the evaluation of echo pulses which occur during the dying-down of the transducer is possible.

5 Claims, 3 Drawing Figures

SONIC OR ULTRASONIC DISTANCE MEASURING DEVICE

The invention relates to a sonic or ultrasonic distance measuring device comprising an electroacoustic transducer which is used alternately as transmission transducer for the transmission of sonic or ultrasonic pulses and as reception transducer for the reception of the reflected echo pulses, and a circuit arrangement connected to the transducer for the processing of the electrical reception signals furnished by the transducer in response to the received echo pulses, which circuit arrangement includes an amplifier with controllable gain and a threshold value discriminator following the amplifier.

Sonic or ultrasonic distance measuring devices of this type are used for example for the filling level measurement in a container. In this case the electroacoustic transducer is arranged in the container above the highest level occurring in such a manner that the sonic or ultrasonic pulses transmitted by it strike the surface of the material in the container and the echo pulses reflected at the surface of the material are sent back to the transducer. The excitation of the transducer is by electrical excitation pulses with the frequency of the sonic or ultrasonic wave which are generated by a transducer pulse generator and applied via a transmission/reception switch to the transducer. The electrical reception signals generated by the transducer in response to the received echo signals are applied via the transmission/reception switch to the processing circuit which determines therefrom the time interval between the instants of the transmission of a transmission pulse and the reception of an echo pulse originating from said transmission pulse. This time interval corresponds to the travel time of the ultrasonic wave in the container and is thus an indication of the filling level in the container.

The threshold value discriminator contained in the processing circuit serves to distinguish the echo signals from noise and interference signals. The discriminator threshold value is set so that the amplified echo signals exceed said threshold value. Since the reflected echo pulses are the weaker the greater the measured distance is, it is known to control the gain of the controllable amplifier in each transmission cycle in dependence upon the time in such a manner that the echo signals originating from echo pulses arriving from a greater distance are amplified to a greater extent than the echo signals originating from echos of a near target so that the amplified echo signals have approximately the same amplitude irrespective of the distance measured. The discriminator threshold value is then set according to this amplitude.

In sonic or ultrasonic distance measuring devices comprising a single electroacoustic transducer which is operated alternately as transmission transducer and reception transducer the problem arises that the transducer does not stop oscillating immediately when the electrical excitation pulse ceases but continues to oscillate with decreasing amplitude during a certain dying-down time. This dying-down oscillation is converted by the transducer in the same manner as an oscillation caused by impinging sonic or ultrasonic waves to electrical output signals which pass via the transmission/reception switch to the processing circuit. This is undesirable for several reasons. Firstly, the dying-down signals have over a large part of the dying-down time an amplitude which is very great compared with the echo signals so that the amplifier of the processing circuit is overdriven to a great extent and becomes saturated. On the other hand, there is a danger that dying-down signals which exceed the discriminator threshold value will incorrectly be interpreted as echo signals. Finally, the processing circuit cannot recognize echo signals which occur in the dying-down time and are superimposed on the dying-down signals and consequently these echo signals are lost. This results in a limitation of the smallest distance which can still be measured.

To avoid the former disadvantages it is known to block the processing of the output signals of the sonic or ultrasonic transducer for a certain time from the start of the transmission pulse onwards. The blocking time is preferably not terminated until the amplitude of the amplified dying-down signals has dropped below the discriminator threshold value. This avoids the amplifier becoming saturated. However, the disadvantage remains that echo signals occuring in the blocking time cannot be detected.

The object of the invention is the provision of a sonic or ultrasonic distance measuring device of the type outlined at the beginning in which the echo signals occurring in the dying-down time of the sonic or ultrasonic transducer can be detected and there is no danger of overdriving the amplifier of the processing circuit by the dying-down signals.

To solve this problem the sonic or ultrasonic distance measuring device according to the invention comprises a gain control circuit which during a predetermined period after the start of each transmission pulse controls the gain of the amplifier in accordance with a stored function which is defined in accordance with the dying-down behaviour of the transducer in such a manner that the electrical signals originating from the dying-down of the transducer after the amplification are smaller than the threshold value of the threshold value discriminator and approach said threshold value as closely as possible.

In the sonic or ultrasonic distance measuring device according to the invention there is no blocking time after cessation of the transmission pulse. The decay signals generated by the dying-down of the transducer cannot however overdrive the amplifier and also not be incorrectly interpreted as echo signals because by the gain control they are always kept beneath the discriminator threshold value. When an echo signal originating from a short distance is superimposed on the decay signals the sum signal exceeds the discriminator threshold value so that the echo signal is detected even during the dying-down and processed. In this manner each echo occurring can be detected even when the distance being measured is very small.

If it can be assumed that the dying-down behaviour of the transducer after installation does not change appreciably over a long period of time, the stored function can be permanently set. However, in many uses of sonic or ultrasonic distance measuring devices, in particular in level measurement, the decay behaviour can change at short notice in unpredictable manner, for example due to incrustation, environmental influences or different filling materials. According to a preferred further development of the invention the sonic or ultrasonic distance measuring device therefore includes an analysis circuit which receives the output signal of the transducer, analyses the time variation of the dying-down signal and sets the stored function in accordance with the result of the analysis.

Figure 2:
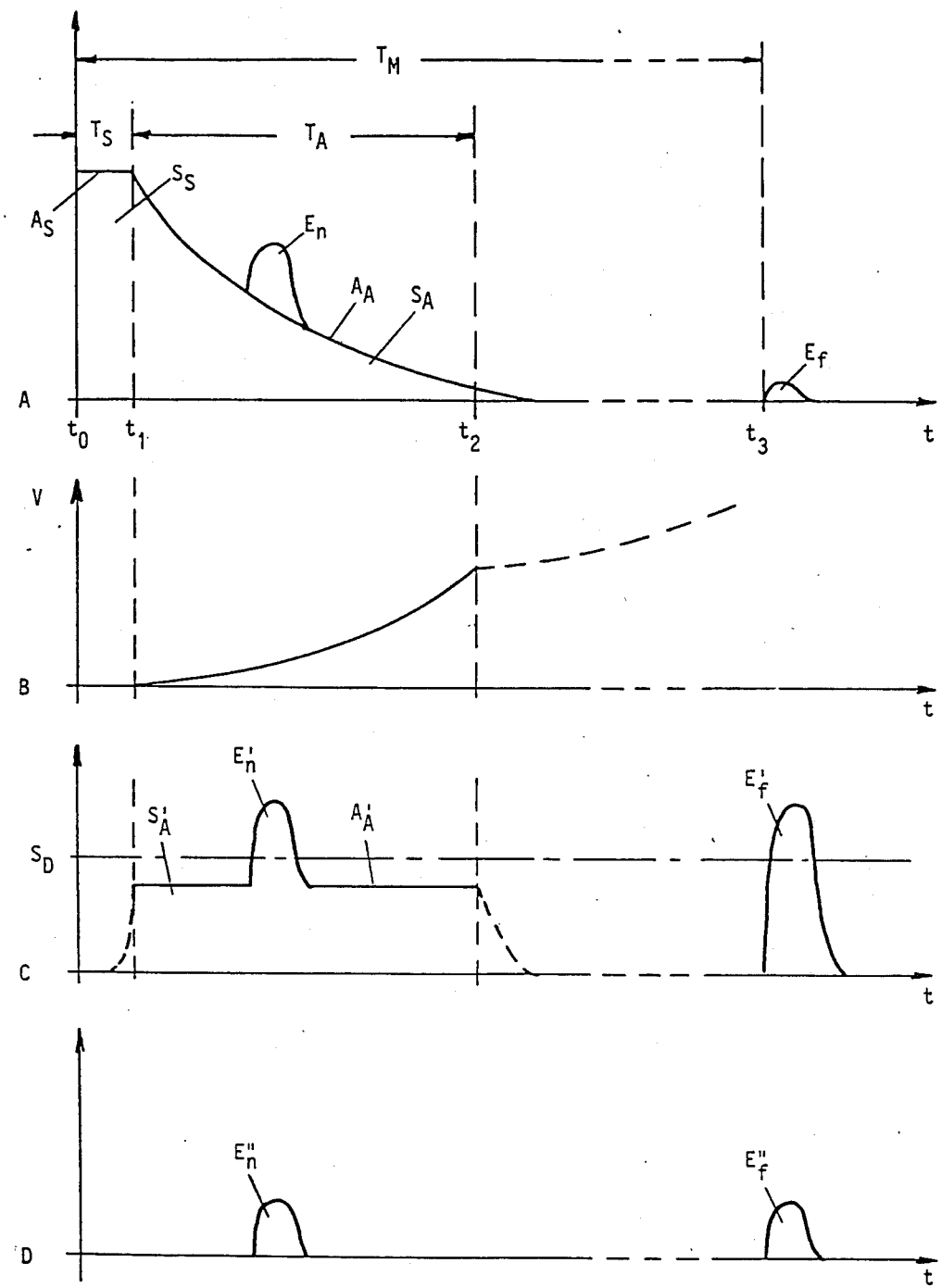
Figure 3:
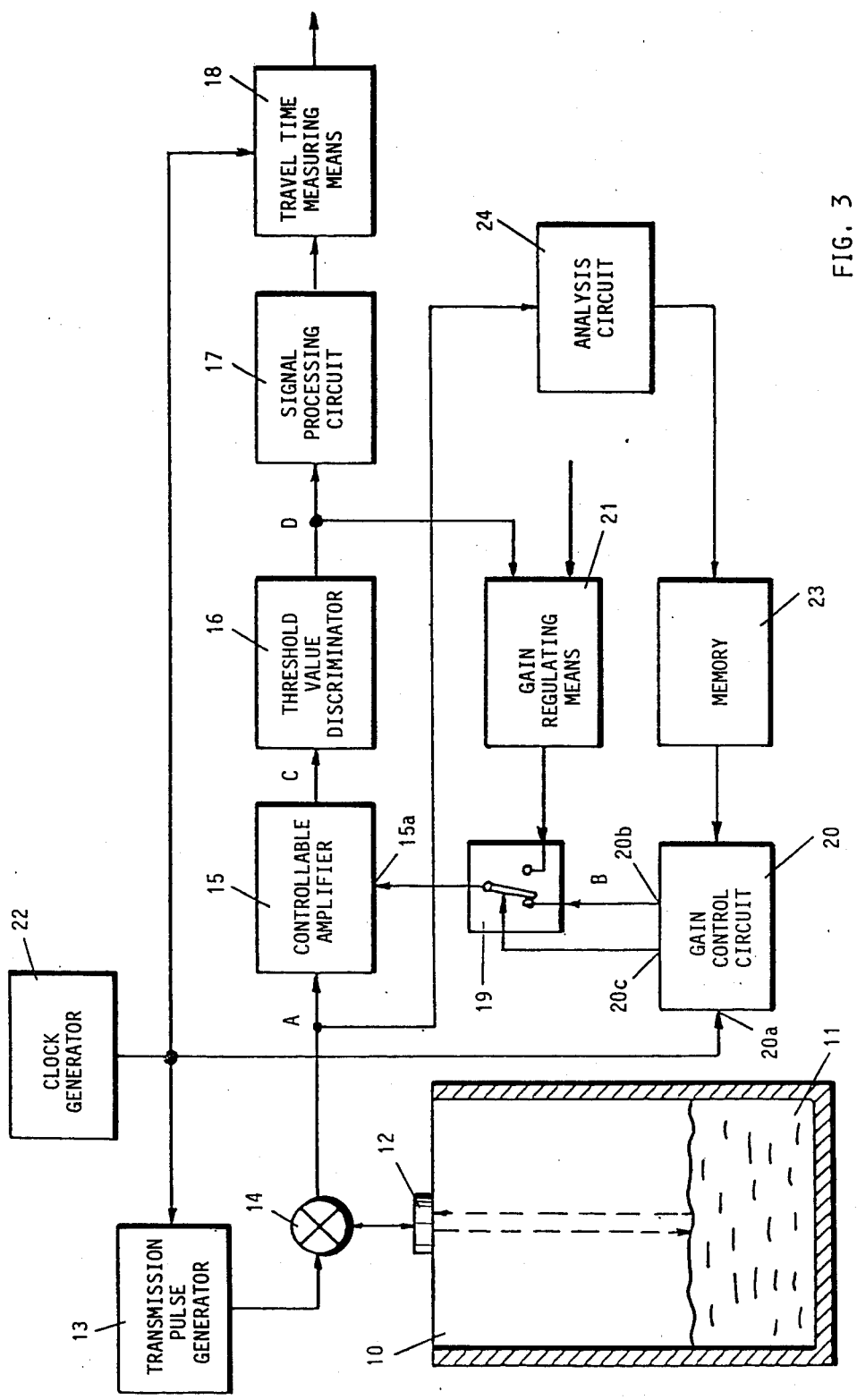

Further features and advantages of the invention will be apparent from the following description of an example of embodiment with the aid of the drawings, wherein:

FIG. 1 is a block diagram of an ultrasonic distance measuring device according to the invention used for echo sounding for level measurement, FIG. 2 shows diagrams of the time variation of signals in the arrangement of FIG. 1 and FIG. 3 is the block diagram of a modified embodiment of the echo sounding device of FIG. 1.

FIG. 1 shows a container 10 in which there is a material 11. For measuring the level of the material in the container 10 at the top of the container above the highest level which occurs an ultrasonic transducer 12 is disposed which is operated alternately as transmission transducer and reception transducer. In the transmission phase the ultrasonic transducer 12 is excited by an electrical signal so that it generates an ultrasonic pulse which is directed vertically downwardly into the material 11 disposed in the container. In the reception phase the ultrasonic transducer 12 receives the echo signal reflected back from the surface of the material 11 and converts it to an electrical signal. Each measurement cycle consists of a transmission phase and a reception phase.

A transmission pulse generator 13 generates at the start of each measurement cycle during the transmission phase the pulse-like electrical signal necessary for the excitation of the ultrasonic transducer 12 and having the frequency of the ultrasonic wave to be transmitted. This signal is applied via a transmission/reception switch 14 to the ultrasonic transducer 12. When after cessation of the transmission pulse an echo pulse reflected back from the material 11 strikes the ultrasonic transducer 12 the latter is set in oscillation which is converted by the transducer to an electrical signal which is applied via the transmission/reception switch 14 to a processing circuit which includes in succession an amplifier 15, a threshold value discriminator 16, a signal processing circuit 17 and a travel time measuring means 18.

The gain of the amplifier 15 is controllable by a control signal applied to a gain control input 15a. The threshold value discriminator 16 connected to the output of the controllable amplifier 15 allows to pass only signals whose amplitude exceeds a fixed discriminator threshold value. The signals allowed through by the threshold value discriminator 16 are processed by the signal processing circuit 17 in the manner necessary for the travel time measurement. The travel time measuring means 18 measures the interval between the transmission of each transmission pulse and an echo pulse originating from said transmission pulse. This time interval is equal to the travel time of the ultrasonic pulse in the container 10 from the ultrasonic transducer 12 to the surface of the material 11 and back to the ultrasonic transducer 12. This travel time is a measure of the distance between the ultrasonic transducer 12 and the surface of the material 11 and thus also a measure of the filling level in the container 10. The travel time measuring means 18 furnishes at the output a signal proportional to the travel time or level which can be used in the desired manner for displaying the level or initiating switching operations.

The gain control input 15a of the amplifier 15 is connected by an electronic changeover switch 19 either to the output of a gain control circuit 20 or to the output of a gain regulating means 21. Actuation of the switch 19 is in a manner explained in detail below by the gain control circuit 20.

A clock generator 22 furnishes at the start of each measurement cycle a clock signal to all stages which must be activated at this instant. This clock signal serves in particular to initiate the emission of the transmission pulse by the transmission pulse generator 13, to initiate the function of the gain control circuit 20 and to start the time measurement in the travel time measuring means 18 which is then stopped by the output signal of the signal processing circuit 17.

The mode of operation of the ultrasonic distance measuring device of FIG. 1 will be explained with the aid of the diagrams of FIG. 2.

The diagram A shows the time variation of the output signal of the ultrasonic transducer 12 present at the input of the amplifier 15 during transmission and reception of possible echo pulses. For simplification, in diagram A, as in diagrams C and D, only the positive envelope curves of the signals are illustrated. In reality, these are oscillations with the frequency of the sonic or ultrasonic wave whose amplitudes vary in accordance with the envelope curves illustrated. The measurement cycle starts at the instant $t_0$. At this instant the clock generator 22 furnishes the trigger pulse which initiates the emission of a transmission pulse by the transmission pulse generator 13. The transmission pulse is applied to the ultrasonic transducer 12 during the transmission time $T_S$ from the instant $t_0$ to the instant $t_1$. During this time the ultrasonic transducer 12 oscillates with an amplitude depending on the amplitude of the transmission pulse and consequently at the input of the amplifier 15 there is a signal $S_S$ with the amplitude $A_S$.

The transmission pulse ends at the instant $t_1$. The ultrasonic transducer 12 does not however immediately cease oscillating but gradually dies down during the dying-down time $T_A$. In an ideal case, which is illustrated in diagram A, the amplitude of the oscillations decreases exponentially. However, depending on the installation conditions the amplitude variation in the dying-down may also be irregular, in particular due to interference reflections. As a result at the input of the amplifier 15 there is a dying-down signal $S_A$ with a correspondingly decreasing amplitude $A_A$. The assumed end of the dying-down time $T_A$ is the instant $t_2$ at which the dying-down amplitude $A_A$ drops beneath a value which is no longer troublesome.

The reception phase following the transmission time $T_S$ is long enough for an echo pulse reflected with the maximum measurement distance which occurs to be able to return to the ultrasonic transducer 12 before the next measurement cycle is initiated by emission of a transmission pulse. In diagram A of FIG. 2 the reception signal $E_f$ is shown which is caused by an echo pulse coming from a relatively large distance. The interruption of the time axis indicates that the time interval of the echo pulse $E_F$ is not illustrated in the correct relationship to the transmission time $T_S$ and the dying-down time $T_A$. The echo pulse $E_f$ has a very small amplitude compared with the transmission pulse. The time interval $T_M$ between the instant $t_0$ of the start of the transmission pulse and the instant $t_3$ of the start of the echo pulse $E_F$ is equal to twice the travel time of the ultrasonic wave over the distance between the ultrasonic transducer 12 and the surface of the material 11. This travel time is a measure of the level in the container 10.

The echo pulse $E_f$ is received when the level in the container 10 is low.

If on the other hand the level in the container 10 is very high and the surface of the material 11 therefore a very small distance away from the ultrasonic transducer 12, the travel time of the echo pulse may be so short that it arrives at the ultrasonic transducer 12 during the dying-down time $T_A$ and is superimposed on the decaying oscillation of the ultrasonic transducer. Such an echo pulse $E_n$ is also illustrated in diagram A. Due to the very small distance measured it has a substantially greater amplitude than the echo pulse $E_f$ from a large distance. However, even if the amplitude of the near echo pulse $E_n$ is greater than the dying-down amplitude of the ultrasonic transducer the echo pulse $E_n$ cannot be evaluated when the evaluation is blocked during the dying-down time. In this case it is not possible to measure distances for which the echo travel time is shorter than the dying-down time.

In the arrangement of FIG. 1 there is no blocking of the evaluation circuit during the dying-down time. On the contrary, the evaluation of the echo pulses superimposed on the dying-down oscillation is made possible by the gain control circuit 20.

The gain control circuit 20 is a function generator which is activated at the instant $t_0$ at the start of each measurement cycle by a pulse applied to the trigger input 20a by the clock generator 22 and thereupon furnishes at its output 20b a voltage which changes in accordance with a function stored in a memory 23. Furthermore, after each initiation the gain control circuit 20 furnishes at an output 20c a control signal which brings the changeover switch 19 for the duration of the dying-down time $T_A$ into the position in which the gain control input 15a of the controllable amplifier 15 is connected to the output 20b of the gain control circuit 20. The changeover switch 19 which is illustrated in the drawings as mechanical switch is of course in reality an electronic switch operating without delay.

The diagram B of FIG. 2 shows the time variation of the gain v of the controllable amplifier 15 which is effected by the output voltage of the gain control circuit 20 applied via the switch 19 to the gain control input 15a. During the transmission time $T_S$ between the instants $t_0$ and $t_1$ the gain v is very small and preferably practically equal to zero. From the instant $t_1$ onwards the gain increases due to the function stored in the memory 23 and processed by the gain control circuit 20 in such a manner that the time variation of the dying-down signal produced by the decaying oscillation of the ultrasonic transducer 12 is just compensated so that the amplified dying-down signal at the output of the amplifier 15 has a substantially constant amplitude which is slightly below the discriminator threshold value of the threshold value discriminator 16. The output signal of the controllable amplifier 15 thus obtained is illustrated in diagram C of FIG. 2 and diagram D of FIG. 2 shows the corresponding output signal of the threshold value discriminator 16.

The discriminator threshold value is illustrated in diagram C at $S_D$. During the transmission time $T_S$ between the instants $t_0$ and $t_1$ the output signal of the amplifier 15 is preferably zero but in any case so small that it does not reach the discriminator threshold value $S_D$. In the dying-down time $T_A$ between the instants $t_1$ and $t_2$ at the output of the amplifier 15 and amplified dying-down signal $S_A'$ appears which is of substantially constant amplitude $A_A'$ which is somewhat smaller than the discriminator threshold value $S_D$. Accordingly, the amplified dying-down signal $S_A'$ does not produce an output signal at the output of the threshold value discriminator 16 (diagram D).

If however the echo pulse $E_n$ from a close target is superimposed on the dying-down signal $S_A$ the amplified echo pulse $E_n'$ obtained at the output of the amplifier 15 exceeds the discriminator threshold value $S_D$ and at the output of the threshold value discriminator 16 a pulse $E_n''$ appears which can be further processed by the signal processing circuit 17 (diagram D).

At the instant $t_t$ at the end of the dying-down time $T_A$ the control signal furnished by the output 20c of the gain control circuit 20 brings the switch 19 into the other position in which the gain control input 15a is connected to the output of the gain regulating circuit 21. The gain regulating circuit 21 then controls the gain of the amplifier 15 in the remaining reception phase in the manner usual in ultrasonic distance measuring devices so that the received useful target echo pulses are amplified to a level increasing with increasing measurement distance so that they exceed the discriminator threshold value $S_D$. This regulation can be done on the basis of the signals obtained at the output of the threshold value discriminator 16 and/or control quantities supplied from the outside. Since the expert is familiar with this type of gain control it will not be described in detail here.

Because of the gain regulation effected by the gain regulating circuit 21 the amplified distant target echo pulse $E_f'$ at the output of the amplifier 15 also exceeds the discriminator threshold value $S_D$ (diagram C) so that at the output of the threshold value discriminator 16 a corresponding useful pulse $E_f''$ (diagram D) is obtained which can be processed by the signal processing circuit 17.

There are various possibilities for fixing the function stored in the memory 23. If the decay behaviour of the ultrasonic transducer 12 is predictable with sufficient accuracy on the basis of known installation conditions and it can also be expected that this dying-down behaviour does not substantially change in the course of time, the function can be permanently set when the device is manufactured. The gain control circuit 20 can then for example be an analog function generator whose function is defined by fixedly wired circuit elements which then form the memory 23.

If on the other hand the dying-down behaviour of the ultrasonic transducer 12 is influenced by the particular installation conditions the function in the memory 23 is preferably made adjustable. The dying-down signal is picked up after installation of the device and the function is optimally set in the memory 23 corresponding to the dying-down signal curve recorded. This solution also affords the possibility of readjusting the function from time to time to adapt it to changes in the dying-down behaviour due for example to aging phenomena.

FIG. 3 illustrates a modified embodiment of the echo sounding of FIG. 1 which takes account in optimum manner of all possibilities and in particular also of sudden unpredicable changes of the dying-down behaviour such as those due to incrustation, different types of filling materials, environmental influences, or the like. The embodiment of FIG. 3 differs from that of FIG. 1 only in an additional analysis circuit 24 which receives the output signal of the ultrasonic transducer 12, analyses the curve form of the dying-down signal and sets the function in the memory 23 in accordance with the particular curve form last determined. The analysis may take place in each measurement cycle or alternatively at larger intervals of time.

In particular in the embodiment of FIG. 3 the memory 23 is preferably a digital memory and the function generator 20 as well as the analysis circuit 24 are correspondingly constructed as digital circuits. Using modern technology the circuits 20, 23, and 24 can be formed by a suitably programmed microcomputer.

The remaining circuits contained in the arrangement of FIG. 1 are of conventional type with which the expert is familiar and therefore need not be described in detail.

I claim:

1. Sonic or ultrasonic distance measuring device comprising an electroacoustic transducer which is used alternately as a transmission transducer for the transmission of sonic or ultrasonic pulses and as a reception transducer for the reception of reflected echo pulses, a circuit arrangement connected to the transducer for processing of electrical reception signals furnished by the transducer in response to the received echo pulses, which circuit arrangement includes an amplifier with controllable gain and a threshold value discriminator having a threshold value following the amplifier, and a gain control circuit (20) which during a predetermined period after the start of each transmission pulse during a dying-down time of the transducer controls the gain of the amplifier (15) in accordance with a stored function which is defined in accordance with the dying-down behaviour of the transducer (12) in such a manner that electrical signals originating during the dying-down time of the transducer after amplification by the amplifier are smaller than the threshold value of the threshold value discriminator (16) and approach said threshold value as closely as possible.

2. Sonic or ultrasonic distance measuring device according to claim 1, wherein the stored function is adjustable.

3. Sonic or ultrasonic distance measuring device according to claim 2, further comprising an analysis circuit (24) which receives an output signal of the transducer (12), analyses the time variation of a dying-down signal of the transducer and adjusts the stored function in accordance with the result of the analysis.

4. Sonic or ultrasonic distance measuring device according to claim 3, wherein the gain control circuit (20), the memory (23) containing the function and the analysis circuit (24) are formed by a microcomputer.

5. Sonic or ultrasonic distance measuring device according to claim 1, further comprising a changeover switch (19) which connects a gain control input (15a) of the controllable amplifier (15) during the predetermined period after the start of each transmission pulse to a output of the gain control circuit (20) and in the remaining part of each transmission/reception cycle to an output of a gain regulating means (21).

* * * * *